Aug. 3, 1937.   F. H. BLACK   2,088,583
HYDRAULIC TRANSMISSION
Filed Nov. 1, 1935   2 Sheets-Sheet 1
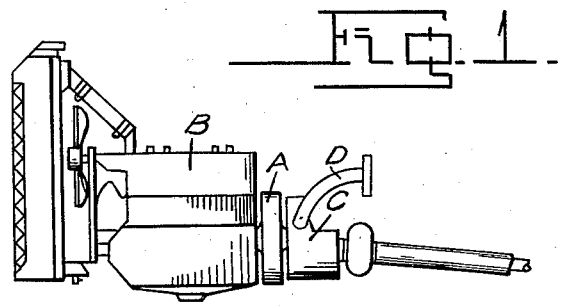
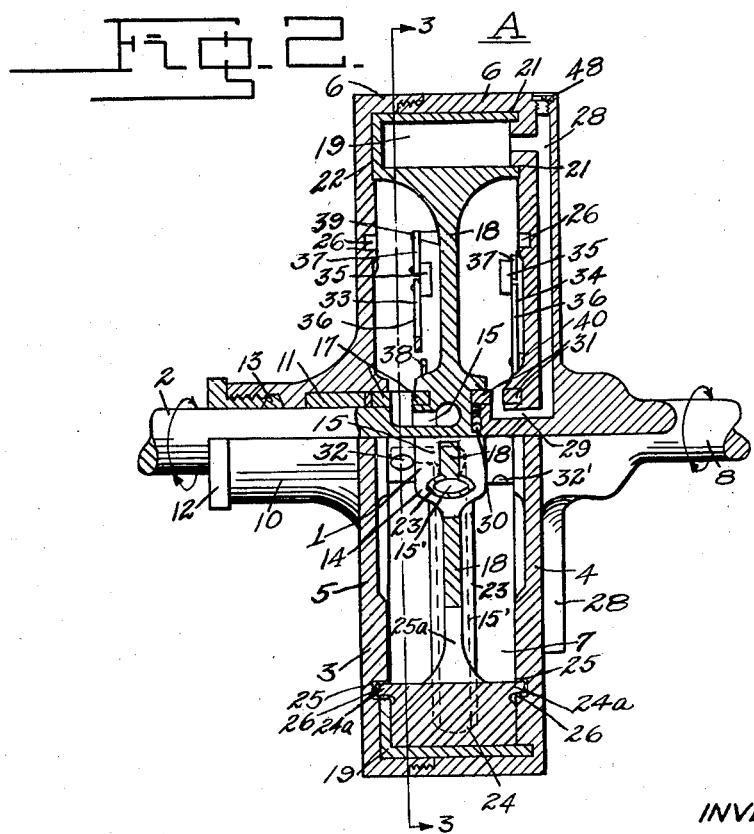
INVENTOR
Frederick H Black
BY William A. Rounds
ATTORNEY Aug. 3, 1937.                F. H. BLACK                 2,088,583
                        HYDRAULIC TRANSMISSION
                    Filed Nov. 1, 1935          2 Sheets-Sheet 2
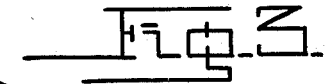
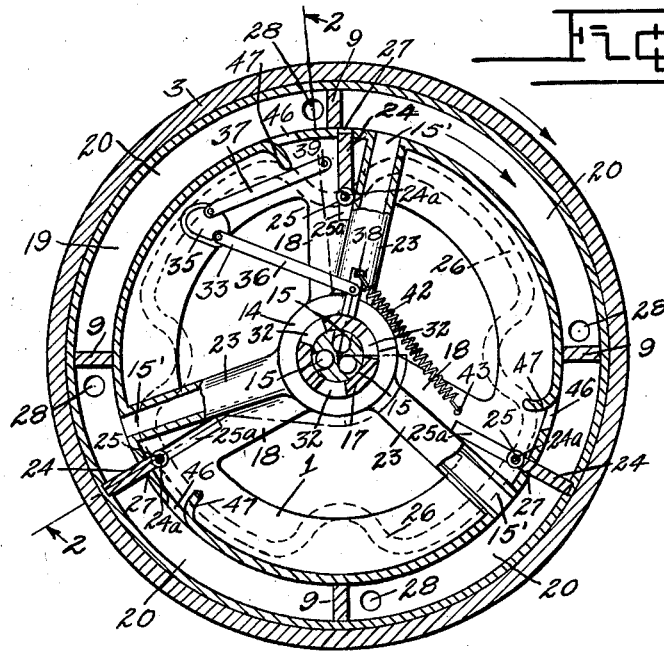
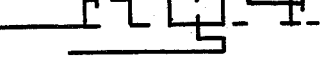
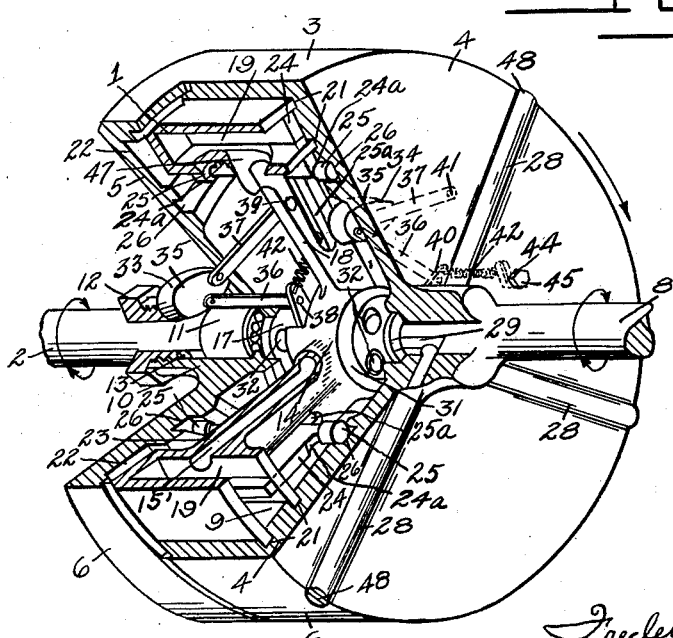
INVENTOR
Frederick H Black
BY William H Rounds
ATTORNEY Patented Aug. 3, 1937

2,088,583

UNITED STATES PATENT OFFICE 2,088,583

HYDRAULIC TRANSMISSION

Frederick H. Black, Fort Sill, Okla.

Application November 1, 1935, Serial No. 47,835

6 Claims. (Cl. 192—58)

(Granted under the act of March 3, 1883, as amended April 30, 1928; 370 O. G. 757)

This invention described herein may be manufactured and used by or for the Government for governmental purposes without the payment to me of any royalty thereon.

This invention relates to hydraulic power transmissions particularly adapted for use in automotive vehicles but applicable to practically any type of equipment in which a variable speed drive is required.

The object of the present invention is to provide a continuous variable transmission device adapted for use in automotive vehicles whereby power is transmitted from a driving member of a power unit to a driven member through the medium of hydraulic action without the use of forward gears and clutch now employed in most automotive vehicles.

A further object of the invention is to provide an improved hydraulic transmission mechanism particularly adapted to automobile drives.

With the above and other objects and advantages in view the invention consists of certain features of construction and operation of parts which will hereinafter appear and in which:

Fig. 1 is a longitudinal elevation diagrammatically indicating the relationship of my improved hydraulic transmission device to an internal combustion engine;

Fig. 2 is a sectional view through the hydraulic transmission device taken on line 2—2 of Fig. 3;

Fig. 3 is a transverse cross-section along the line 3—3 of Fig. 2, and

Fig. 4 is a perspective view of the hydraulic transmission partially in section.

In the illustrated embodiment characterizing my invention A indicates generally my improved continuous variable transmission device within which the hydraulic portion of the transmission is situated and which is preferably combined with and driven by an internal combustion engine B. A conventional type of reverse and neutral transmission gearing C which forms a unitary structure with the improved hydraulic transmission device A is to be utilized with the device. A small brake (not shown) operated by a brake pedal D is provided to permit shifting to reverse and neutral without stopping the power unit B but forms no part of this invention.

The continuous variable transmission A, according to the present invention, comprises a driving member (1) which is connected to a source of power through a driving shaft (2) which in the case of the usual automobile would be the crank shaft of the engine. A driven member or rotor (3) in the form of a cylindrical casing surrounds the driving member (1) and has end walls (4) and (5) with sectional flange portions (6) suitably joined together by screw threads as illustrated in Fig. 2 of the drawings and thereby forming a housing for the driving member; also the housing provides a reservoir (7) for the operating fluid of the transmission. The end wall (4) of the driven rotor (3) has an integral driven shaft (8) and is provided with four projecting portions or piston vanes (9) which are equally spaced around the inner surface of the end wall (4) of the driven rotor (3), for a purpose which will hereinafter appear, and the end wall (5) of the driven rotor is provided with a hub extension (10) which is mounted on a bearing sleeve (11) surrounding the driving shaft (2). A packing gland (12) is screw threaded in the outer end of the hub extension (10) against a gasket (13) on the driving shaft (2) to provide an ordinary stuffing box or packing gland.

The driving member (1) is in the form of a spoked wheel having a central hub (14) presenting fluid passageways (15) which extend from the middle portion of the hub (14) toward the end wall (5) of the driven rotor (3) and thence into the reservoir (7) through a ported sleeve valve (17) on one side of the hub (14) The hub (14) of the driving member (1) is made integral with or otherwise secured to the driving shaft (2), and is provided with webs or spokes (18) which support an annular fluid channel member (19) open at the side thereof adjacent the end wall (4) of the driven rotor (3) and is adapted to receive the projecting portions or piston vanes (9) of the driven rotor (3), whereby four compartments (20) are formed within the fluid channel member (19).

The channel member (19) is rotatably mounted in grooves (21) and (22) formed around the inner surface of the end walls (4) and (5) respectively of the driven rotor (3), with the annular periphery of said channel member fitting against the inner circumferential surface of the driven rotor. Radially extending from the hub (14) of the driving motor (1) to the annular channel member (19) are three other equally spaced spokes (23) each having a radial passageway (15′) provided therein which leads from the annular channel (19) to the inner end of a passageway (15) as illustrated in Figs. 3 and 4 of the drawings, whereby fluid within the annular channel member (19) may be conducted through the passageways (15′) provided in the spokes (23), then through the passageways (15) formed within the hub (14) of the driving member (1) and thence, discharge or deliver the fluid into the reservoir (7) through the sleeve valve (17). The spokes (23) are made integral with the webs (18) and the axis of the passageways (15') provided in the spokes lies in the radial plane of the webs.

In the driving member (1) are vanes or gates (24) which are controlled by means of rollers (25) working in cam slots (26) formed on the inner faces of the end walls (4) and (5) of the driven rotor (3) so that, according to the relative speed of the driving member (1) and the driven rotor (3), the gates (24) are moved out through apertures (27) provided in the inner wall of the channel member (19), into contact with the outer wall thereof, or drawn inwardly so that they clear the lower portion of the projecting portions or vanes (9) of the driven rotor (3), as illustrated in Fig. 3 of the drawings. These gates (24) are provided with trunnions (24a) carrying the rollers (25) and are guided in radial slots (25a) formed in the webs (18). The end wall (4) of the driven rotor (3) is provided with equally spaced radially extending vents, or fluid conduits (28) which lead from the pressure side of the vanes or projections (9) of the driven rotor (3) to the reservoir (7) through longitudinal passageways (29) formed in and around an extension of the driven shaft (8). The portion of the driven shaft (8) which extends into the casing (3) abuts against one side of the hub (14) of the driving shaft (2). Herein anti-friction bearings (30) are provided between the shaft and the hub because they rotate relative to each other. The passageways (29) in the extension of the driven shaft (8) are controlled by a second ported sleeve valve (31) for the driven rotor (3). The sleeve valve (17) for the driving member (1) and the sleeve valve (31) for the driven rotor (3) provide means for obtaining a variable flow of fluid for operating the device. Both of the sleeve valves (17) and (31) are similar in operation and construction and as stated are in the form of sleeves or rings having the same number of ports (32) and (32') provided therein, as there are fluid passageways (15) or (29), which are equally spaced around the periphery thereof, there being three ports (32) in the sleeve valve (17) and four ports (32') in the sleeve valve (31). The valves (17) and (31) are operated by centrifugal governors (33) and (34) respectively, each governor (33) and (34) having a counter-balancing weight (35) and arm members (36) and (37). The weight (35) for the governor (33) is pivotally connected to a rocker arm (38) provided on the sleeve valve (17), by means of one of the arm members (36) and to the driving member (1) at (39) by an arm member (37) and the weight (35) for the governor (34) is pivotally connected to a rocker arm (40) provided on the sleeve valve (31) by an arm member (36) and to the driven rotor (3) at (41) by an arm member (37), as illustrated in Fig. 4 of the drawings. Each of the governors (33) and (34) has a tension spring (42) which normally holds the valves (17) and (31) in open position. One end of the spring (42) for the governor (33) is secured to the rocker arm (38) provided on the sleeve valves (17), and the other end thereof is secured at (43) to a web or spoke (18) of the driving member. The spring (42) for controlling the governor (34) is connected at one end to the rocker arm (40) provided on the sleeve valve (31), and the other end thereof is connected to the driven rotor (3) at (44) by an adjusting nut (45).

The operating fluid is caused to enter the annular channel member (19) from the reservoir (7) through openings (46) provided therein, one of the openings being provided adjacent each of the outer ends of the fluid conduits (23). In order to aid in causing the fluid to enter the annular channel member (19) through the openings (46) an inwardly extending or lip portion (47) in the form of a scoop is provided adjacent the rear end of each of the openings. In filling the apparatus with any suitable operating fluid, the fluid is introduced into the transmission through filling plugs (48) provided at the outer ends of one or more of the conduits (28).

In operation, my device functions as follows: The transmission having been filled with the operating fluid and the driving member (1) rotated in the direction of the arrow as illustrated in Figs. 2, 3 and 4 of the drawings, the operating fluid enters the annular channel (19) of the driving member through the openings (46) by means of the scoops (47). Assuming that the relative position of the driving member (1) and the driven rotor (3) is such that two of the gates (24) operating in the slots (26) of the driven rotor are caused to be moved outwardly, the fluid in the compartments (20) formed by the projections or vanes (9) extending into the annular channel member (19) is trapped therein, and also assuming that the driving member (1) has attained the desired speed to cause the centrifugal governor (33) to operate to close the valve (17) pressure is set up in the compartments (20) thereby forcing the fluid against the projections or vanes (9) of the driven rotor (3) and out through the small vents (28), consequently causing the driven rotor (3) on the driven shaft (8) to rotate, the device in this condition acting as a direct coupling when the valve (31) is closed. The sleeve valves (17) and (31) for the driving member (1) and driven rotor (3) respectively, are so operated as to provide a variable flow of fluid pressure, depending on the speed of the driving member and driven rotor. When the speed of the driving member is lowered the fluid in the driving member (1) travels from the fluid channel member (19) through the passageways (15') provided in the spokes (23), thence through the passageways (15) in the hub (14), thence through the sleeve valve (17) and empties into the reservoir (7), common to both the valves (17) and (31). Whenever the device is stationary or traveling at a low rate of speed, the valves (17) and (31) are maintained in open position. Should the driving member (1) be accelerated, the governor (33) for the sleeve valve (17) is caused to be operated thereby rotating the valve and reducing the size of the valve opening, whereby a certain amount of fluid pressure is set up in the fluid channel member (19) against the projections or vanes (9) of the driven rotor (3), causing the driven rotor (3) to be rotated as heretofore described. Upon the driving member (1) attaining the desired speed the ports (32) of the sleeve valve (17) are caused to be completely closed thus setting up a greater pressure in the fluid channel member (19) against the projections or vanes (9) of the driven rotor (3). The fluid travels from the annular fluid channel member (19) of the driving member (1) into the vents or conduits (28), the outer ends of which are formed on the pressure side of the projections or vanes (9) of the driven rotor (3). The fluid from the passageways (28) then enters the passageways (29) and thence, through the valve

(31) of the driven rotor to the common reservoir (7). This valve (31) for the driven rotor is operated by the governor (34) in substantially the same manner as the valve (17) of the driving member (1), except that in order to create a longer range in time between the time the valve (31) begins to close and when completely closed the governor (34) is operated slower by means of the adjusting nut (45) on the end of the spring (42). The fluid passageways (29) controlled by the valve (31) are smaller than the fluid passageways (15) of the driving member controlled by the valve (17). The reason for causing the valve (31) to act slower than the valve (17) for the driving member is to permit the driven rotor to reach a high rate of speed before the valve (31) is completely closed.

It will thus be seen from the above description of my invention that I have provided a highly novel and useful form of hydraulic transmission device which is well adapted for all the purposes designated. Even though I have herein shown and described my device as comprising certain details of construction, it is nevertheless to be understood that changes may be made therein without departing from the spirit or scope of my invention.

Having described my invention, what I claim as new and wish to secure by Letters Patent is:

1. A hydraulic transmission of the character described comprising in combination, a driving shaft; a driving member having an annular channel member; a rotor having a casing enclosing said driving member; vanes on the rotor projecting into said channel member; radially movable gates in the driving member adapted to be projected into and out of the channel member; cam means to impart radial movement to the gates as the driving member rotates, and thereby trap fluid in the said channel member between said gates and vanes to impart rotation to the rotor, and a driven shaft integral with said rotor casing.

2. A hydraulic transmission of the character described comprising in combination, a driving shaft; a driving member having an annular channel member; a rotor having a casing enclosing said driving member; vanes on the rotor projecting into said channel member; radially movable gates in the driving member adapted to be projected into and out of the channel member; cam means to impart radial movement to the gates as the driving member rotates and thereby trap fluid in the channel member between said gates and vanes to impart rotation to the rotor; a driven shaft integral with said rotor casing; a reservoir within the casing and valved passages between the reservoir and said annular channel member.

3. A hydraulic transmission of the character described comprising in combination, a driving shaft; a driving member having a hub and an annular channel member; a rotor having a casing enclosing said driving member; vanes on the rotor projecting into said channel member; radial movable gates in the driving member adapted to be projected into and out of the channel member; cam means to impart radial movement to the gates as the driving member rotates and thereby trap fluid in the channel member between said gates and vanes to impart rotation to the rotor; a driven shaft integral with said rotor casing; passages between the reservoir and said annular channel member and sleeve valves for controlling said passages.

4. A hydraulic transmission of the character described comprising in combination, a driving shaft; a driving member having an annular channel member; a rotor having a casing enclosing said driving member; vanes on the rotor projecting into said channel member, radially movable gates in the driving member adapted to be projected into and out of the channel member; cam means to impart radial movement to the gates as the driving member rotates and thereby trap fluid in the channel member between said gates and vanes to impart rotation to the rotor; a driven shaft integral with said rotor casing, a reservoir within the casing; valved passages between the reservoir and said annular channel member and separate centrifugal governors for said valved passages.

5. A hydraulic transmission of the character described comprising in combination, a driving shaft, a driving member having an annular channel member; a rotor having a casing enclosing said driving member; said rotor casing comprising separate cylindrical sections, vanes on the rotor projecting into said channel member; radially movable gates in the driving member adapted to be projected into and out of the channel member; cam means to impart radial movement to the gates as the driving member rotates and thereby trap fluid in the channel member between said gates and vanes to impart rotation to the rotor; a driven shaft integral with said rotor casing, a fluid reservoir within the rotor casing; passages between the channel member and reservoir; valves for controlling said passages and a pair of centrifugal governors for the valves.

6. A hydraulic transmission of the character described comprising in combination, a driving shaft; a driving member having an annular channel member; a rotor having a casing enclosing said driving member; vanes on the rotor projecting into said channel member; radially movable gates in the driving member adapted to project into and out of the channel member; cam means to impart radial movement to the gates as the driving member rotates and thereby trap fluid in the channel member between said gates and vanes to impart rotation to the rotor; a driven shaft integral with said rotor casing; a reservoir within the casing; an extension on said driven shaft; a hub on said driving member; passages formed in said extension and said hub leading into said reservoir; conduits leading from said channel member to said passages and sleeve valves for controlling said passages.

FREDERICK H. BLACK.